Nov. 4, 1952 T. A. PRUGH ET AL 2,616,954

ELECTRICAL APPARATUS

Filed July 5, 1945 2 SHEETS—SHEET 1

THOMAS A. PRUGH
RICHARD L. BEAM
INVENTORS

By: William D. Hall.
ATTORNEY

Nov. 4, 1952 T. A. PRUGH ET AL 2,616,954

ELECTRICAL APPARATUS

Filed July 5, 1945 2 SHEETS—SHEET 2

THOMAS A. PRUGH
RICHARD L. BEAM
INVENTORS

By: William D. Hall.
ATTORNEY

Patented Nov. 4, 1952 2,616,954

UNITED STATES PATENT OFFICE 2,616,954

ELECTRICAL APPARATUS

Thomas A. Prugh, United States Army, and Richard L. Beam, United States Army, Arlington County, Va.

Application July 5, 1945, Serial No. 603,396

3 Claims. (Cl. 175—335)

(Granted under the act of March 3, 1883, as amended April 30, 1928; 370 O. G. 757)

The invention described herein may be manufactured and used by or for the Government for governmental purposes, without the payment to us of any royalty thereon.

This invention is an electrical apparatus and particularly is a variable time delay circuit, useful with certain types of communication equipment.

The primary object of this invention is to provide means for delaying each pulse out of a series of pulses for periods exceeding the time between pulses.

A further object is to provide means for variably delaying each pulse out of a series of pulses.

Another object is to provide means, as indicated, which will operate upon either positive or negative pulses.

A more specific object of the invention is to provide for a tape recording device or the like means for timing the operation of two styluses spaced lengthwise of the tape so that both will be caused to mark or punch the moving tape at the same point thereon lontigudinally of the tape.

Other objects will be apparent from a reading of the following specification and claims.

In a printing tape recorder such as is used normally with teleprinter apparatus, it may be desirable to provide a second recording stylus for marking the tape in some peculiar fashion whenever a pulse of a particular type, as a "start" pulse, is received. The two styluses may be spaced lengthwise of the tape, and then some means must be provided for effectively delaying the start pulse until the tape reaches a position beneath the second stylus. The delay necessary will, of course, depend upon the distance between the two styluses and the speed of the tape. Since changes in operating conditions frequently cause variations in the speed of the tape or other conditions, a device of the nature herein contemplated must likewise provide adjustable time delay.

In this application, it will be assumed that it is desired to operate the principal printing or punching stylus with pulses one hundred fifty milliseconds apart, and that delays between two hundred and six hundred milliseconds will be sufficient to provide proper alignment of the marks or perforations of the two styluses.

Figure 1:
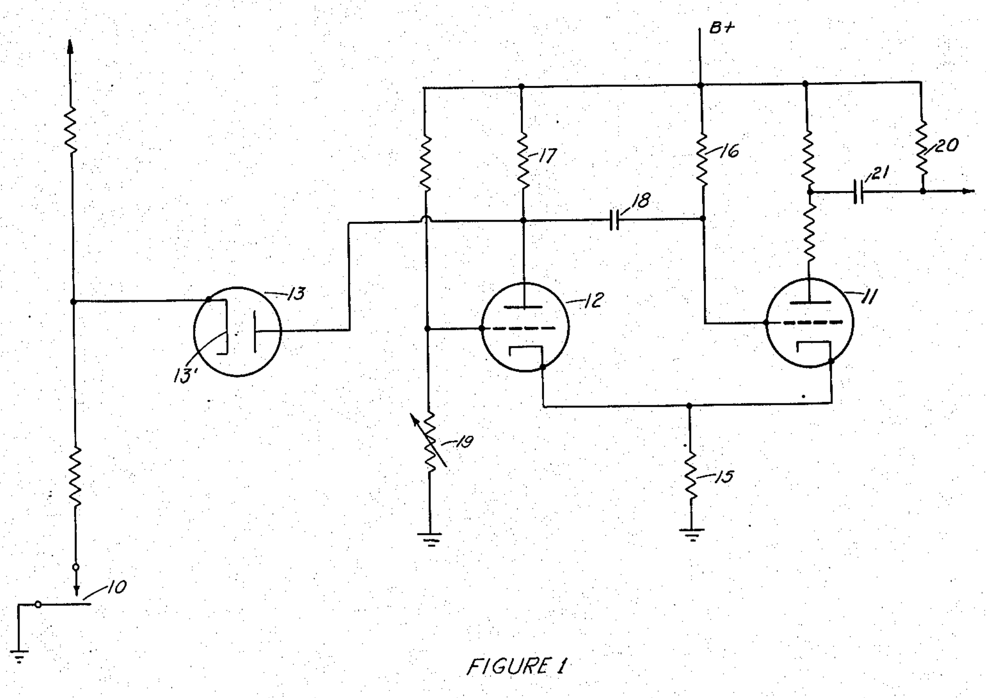
Figure 1 is a schematic diagram of a multivibrator circuit used in the invention.

Referring to the drawings and particularly to Figure 1, 10 represents a switch which is actuated, for example, by a suitable perforation in a punched tape or by the pressing of a character key on the keyboard of a Teletype machine. The switch serves to ground the input to a six-stage start-stop multivibrator chain. Only one multivibrator is shown, all others of the chain being identical except as indicated below. Each multivibrator, and there may be as many as desired, is adapted to delay the start pulse one hundred milliseconds, so that under the conditions indicated the start pulse will be effectively delayed for six hundred milliseconds.

Two tubes 11 and 12 compose the multivibrator proper, and diode 13 serves to isolate the stage from all signals except those produced by the closing of switch 10. Normally, tube 12 is biased to cut off through resistor 15, and tube 11 biased to conduct through resistor 16. Such tubes may hereinafter be referred to as "off" and "on" tubes, respectively. Since tube 12 is cut off, the voltage at its plate approaches the voltage of the B+ source, the value of which will depend upon operating characteristics, and similar voltage appears at the plate of the diode. Under conditions of no signal, the cathode 13′ of diode 13 is likewise at source voltage. When switch 10 closes, the input to the multivibrator is grounded, reducing the potential of cathode 13′, and the diode conducts. The negative going voltage at the plate of diode 13 is coupled to the control grid of tube 11 through condenser 18 and serves to cut off the tube. As conduction ceases in tube 11 at the expiration of the start pulse, the flow of current through resistor 15 decreases, reducing the potential of the cathode of the tube 12, and this latter tube conducts; its plate voltage drops and in turn reduces the voltage at the plate of diode 13 below the value of the voltage at 13′ and effectively isolates the multivibrator from the positive going voltage developed upon the opening of switch 10. The time constant of the multivibrator circuit is such that tube 11 remains cut off for one hundred milliseconds.

The pulse derived at the output of stage 1 of the multivibrator chain (Figure 1) is differentiated across the resistor-capacitor network 20—21 and applied to the input of the next multivibrator stage, that is, to the cathode of a diode corresponding to tube 13. Inasmuch as the cathodes of all of these diodes are normally maintained at source voltage, the positive pulse derived from the leading edge of the output of stage 1 does not affect the input of stage 2, whereas the negative pulse derived from the trailing edge thereof will cause the diode to conduct. The cycle described in connection with Figure 1 is thus repeated by the several multivibrators of the chain in succession.

Figure 2:
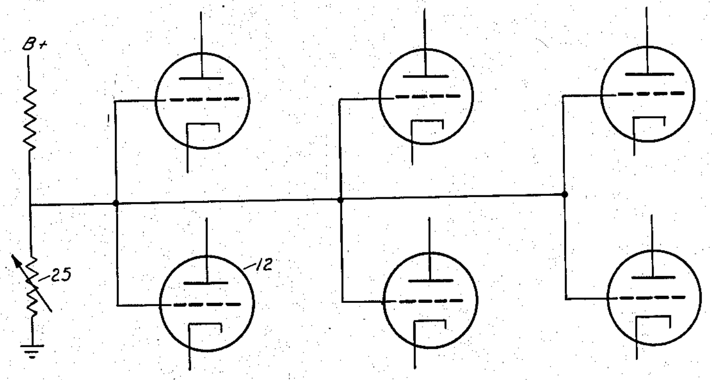
Figure 2 is illustrative of a modified form of multivibrator control.

According to Figure 2, the delay inherent in the several multivibrator stages can be varied by coupling the grids of all the off tubes (see 12, Figure 1) together and giving them a common variable biasing resistor 25 an increase in the resistance at this point serving to provide a slower transfer of conduction from one tube to the other of the multivibrators.

The delay obtainable in the multivibrator stage of Figure 1 can obviously be lengthened or shortened without respect to any other stage in a series by varying resistor 19, or by modifying the value of resistor 16. Of course, fixed resistor 16 may be replaced by a variable element if desired.

Figure 3:
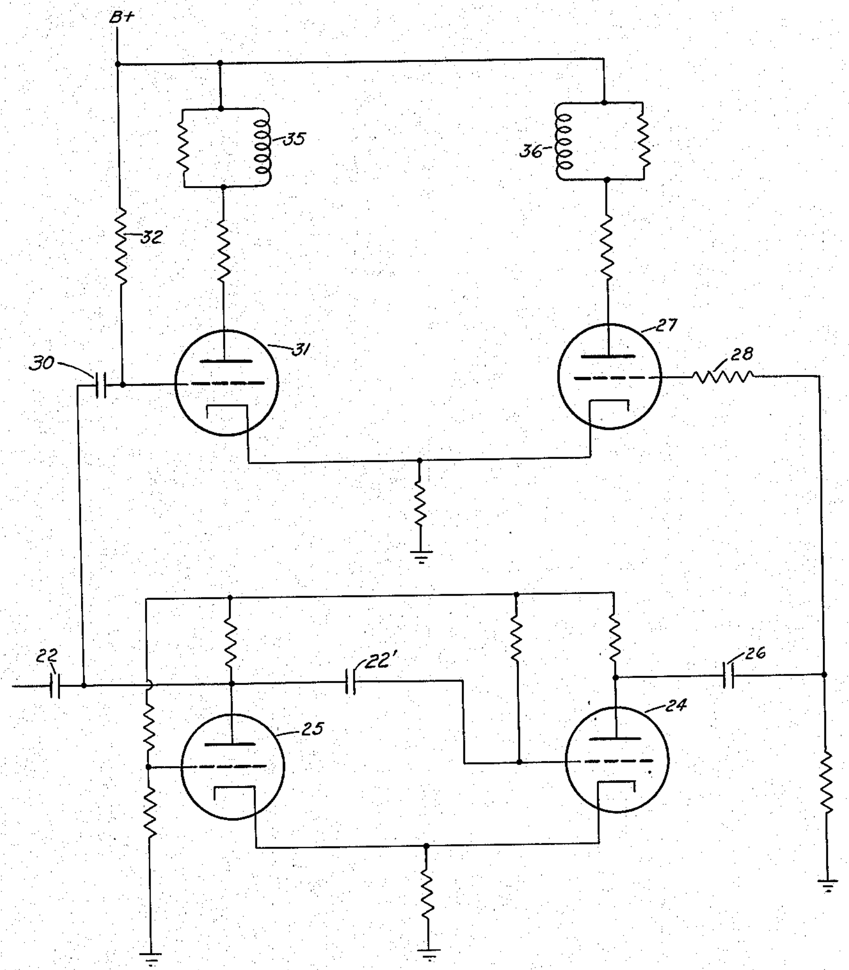
Figure 3 is a schematic diagram of the circuit which actuates the delayed recording stylus.

The stylus assumed to be utilized with the present invention requires for operation a positive and a negative pulse. An additional multivibrator stage is, therefore, used (see Figure 3), and it, with two buffer stages, provides upon proper energization simultaneous positive and negative pulses.

No differentiating circuit (see 20—21, Figure 1) is utilized by the last stage of the multivibrator chain proper. The output of the chain is applied through condensers 22 and 22′ to the grid of on tube 24 of the further multivibrator 24—25 and the output of tube 24 is coupled through a condenser 26 and a limiting resistor 28 to the grid of buffer tube 27, while the output of tube 25 is coupled through condenser 30 to buffer tube 31.

Tube 31 is held conducting through resistance 32 from a source of B+ voltage and buffer tube 27 is normally held nonconducting by cathode bias. As the delayed negative pulse is applied across the input of buffer tube 31, this tube is extinguished, and the current through winding 35 which operates on the stylus (not shown) of the teleprinter decreases. At the same time, the positive going voltage at the plate of tube 24 produces conduction in buffer tube 27, and the current through winding 36 increases. The time constant of the multivibrator of Figure 3 will be on the order of ten milliseconds, the exact value being dependent upon the character of the mark to be made on the teleprinter tape and other considerations.

The foregoing description is in specific terms, and many modifications will readily suggest themselves. The invention should not, in other words, be considered as limited to the exact apparatus shown and described, but, instead, for the true scope thereof, reference should be had to the appended claims.

We claim:

1. The combination of a chain of multivibrators each including an on tube and an off tube, an electrical input, switching means sensitive to a signal of predetermined character only connecting said input and the on tube of the first multivibrator of said chain thereby to extinguish the said on tube of the first multivibrator upon reception of a said signal each of said on tubes being cut off by a signal and restored to its initial condition after an interval determined by the time constant of its multivibrator, means connecting the on tube of one of said multivibrators to the on tube of the final multivibrator of said chain, and a winding associated with the output of each of the tubes of said last-mentioned multivibrator and having its energization determined thereby a change of condition of said last-mentioned multivibrator thereby producing a reversal of the relative energizations of said windings.

2. The combination, with a translating device operable by substantially simultaneous dissimilar pulses a predetermined interval after a timing pulse is received, of a chain of multivibrators each multivibrator comprising an on tube and an off tube and having a time constant determined by said predetermined time interval said multivibrators having an initial stable condition, another tube coupled to the on tube of the first multivibrator of said chain energized by said timing pulse and thereupon furnishing an extinguishing pulse to said on tube, another multivibrator comprising a further on tube and a further off tube, means for coupling said further on tube to the on tube of the preceding multivibrator of the chain to receive an extinguishing pulse upon restoration of said preceding multivibrator to its initial condition, a buffer tube connected to said further on tube and a buffer tube connected to said further off tube the conductivity of each said buffer tubes depending upon its connected multivibrator tube, and a winding associated with each of said buffer tubes and having its energization determined partly thereby.

3. The combination with a translating device of switching means operable by a signal of predetermined character only, a multivibrator comprising an on tube and an off tube, means for coupling said switching means and the on tube of said multivibrator to extinguish said on tube upon operation of said switching means said on tube being restored after an interval determined by the time constant of said multivibrator, another multivibrator comprising a further on tube and an additional off tube, means for coupling the said on tubes for extinguishing said further on tube and promoting conduction in said additional off tube, two windings controlled by the outputs of said last-mentioned two tubes the relative energization thereof thus being reversed upon operation and restoration of said other multivibrator.

THOMAS A. PRUGH.
RICHARD L. BEAM.

REFERENCES CITED

The following references are of record in the file of this patent:

UNITED STATES PATENTS

| Number | Name | Date |
|---|---|---|
| 2,158,285 | Koch | May 16, 1939 |
| 2,193,850 | Andrieu et al. | Mar. 19, 1940 |
| 2,262,838 | Deloraine et al. | Nov. 18, 1941 |
| 2,272,070 | Reeves | Feb. 3, 1942 |
| 2,289,988 | Norton | July 14, 1942 |
| 2,350,069 | Schrader et al. | May 30, 1944 |
| 2,390,608 | Miller et al. | Dec. 11, 1945 |
| 2,390,659 | Morrison | Dec. 11, 1945 |
| 2,401,396 | Wolfner | June 4, 1946 |
| 2,402,916 | Schroeder | June 25, 1946 |